(12) United States Patent
Joung (10) Patent No.: US 11,621,922 B2
(45) Date of Patent: Apr. 4, 2023

(54) SYSTEM FOR NETWORK DELAY GUARANTEE BASED ON FLOW AGGREGATES AND INTERLEAVED REGULATORS

(71) Applicant: Sangmyung University Industry-Academy Cooperation Foundation, Seoul (KR)

(72) Inventor: Jinoo Joung, Seoul (KR)

(73) Assignee: Sangmyung University Industry-Academy Cooperation Foundation, Seoul (KR)

( * ) Notice: Subject to any disclaimer, the term of this patent is extended or adjusted under 35 U.S.C. 154(b) by 78 days.

(21) Appl. No.: 16/821,916

(22) Filed: Mar. 17, 2020

(65) Prior Publication Data

US 2021/0203611 A1 Jul. 1, 2021

(30) Foreign Application Priority Data

Dec. 26, 2019 (KR) .......................... 10-2019-0175007

(51) Int. Cl.
| | | |
|---|---|---|
| *H04L 47/56* | (2022.01) | |
| *H04L 47/62* | (2022.01) | |
| *H04L 47/2425* | (2022.01) | |
| *H04L 45/121* | (2022.01) | |

(52) U.S. Cl.
CPC ............ *H04L 47/56* (2013.01); *H04L 45/121* (2013.01); *H04L 47/2425* (2013.01); *H04L 47/6245* (2013.01)

(58) Field of Classification Search
CPC ... H04L 45/121; H04L 47/2425; H04L 47/56; H04L 47/6245
See application file for complete search history.

(56) References Cited

U.S. PATENT DOCUMENTS

| | | | |
|---|---|---|---|
| 2002/0036981 A1* | 3/2002 | Park .................... | H04L 41/5022 370/395.2 |
| 2003/0208736 A1* | 11/2003 | Teng ......................... | G06F 1/10 716/114 |

(Continued)

FOREIGN PATENT DOCUMENTS

| | | |
|---|---|---|
| KR | 10-2008-0073908 | 8/2008 |
| KR | 10-1287217 | 7/2013 |

OTHER PUBLICATIONS

Jean-Yves Le Boudec, "A Theory of Traffic Regulators for Deterministic Networks with Application to Interleaved Regulators", IEEE/ACM transaction on networking, Oct. 2018.

(Continued)

*Primary Examiner* — Jason E Mattis
*Assistant Examiner* — Bao G Nguyen (57) ABSTRACT

The present disclosure provides a system for network delay guarantee based on flow aggregates and interleaved regulators according to an embodiment of the present disclosure includes: at least one unit network configured to guarantee first-in-first-out (FIFO) for flow aggregates; and at least one interleaved regulator per flow aggregate located at input port or an output port of the at least one unit network, wherein among flows passing through the unit network, flows having the same network input port and the same network output port are aggregated into a single flow aggregate.

3 Claims, 4 Drawing Sheets

(56) References Cited

U.S. PATENT DOCUMENTS

| | | | |
|---|---|---|---|
| 2006/0146710 A1* | 7/2006 | Roy | H04L 12/5601 |
| | | | 370/235 |
| 2012/0173729 A1* | 7/2012 | Lee | H04L 67/1008 |
| | | | 709/228 |
| 2015/0180782 A1* | 6/2015 | Rimmer | H04L 69/22 |
| | | | 370/235 |
| 2021/0083970 A1* | 3/2021 | Liu | H04L 45/34 |

OTHER PUBLICATIONS

Jinoo Joung, Regulating Scheduler (RSC): A novel Solution for IEEE 802.1 Time Sensitive Network (TSN), *Electronics 2019*, 8, 189, www.mdpi.com/journal/electronics, Feb. 2019.

Office Action dated Dec. 14, 2020 corresponding to Korean Patent Application No. 10-2019-0175007, 4 pages.

* cited by examiner

Theorem: $\sup_n(D_n - A_n) = \sup_n(E_n - A_n)$

SYSTEM FOR NETWORK DELAY GUARANTEE BASED ON FLOW AGGREGATES AND INTERLEAVED REGULATORS

CROSS-REFERENCE TO RELATED APPLICATION

This application claims priority of Korean Patent Application No. 10-2019-0175007, filed on Dec. 26, 2019, in the KIPO (Korean Intellectual Property Office), the disclosure of which is incorporated herein entirely by reference.

BACKGROUND OF THE INVENTION

Field of the Invention

The present disclosure relates to a system for network delay guarantee based on flow aggregates and interleaved regulators.

Description of the Related Art

The key to the asynchronous traffic shaping (ATS) technology being standardized in IEEE 802.1 time sensitive network (TSN) task group (TG) is the theorem that a minimal interleaved regulator (IR), attached to a class-based first-in-first-out (FIFO) system does not increase delay upper bound while suppresses the burst accumulation.

However, the existing theorem is to apply the IR to the class-based FIFO system in a limited way, and thus there is a limit in that it is applicable only to a small-scale unit network due to the complexity.

SUMMARY OF THE INVENTION

In the related art, there is a need for a delay guarantee technique having a low complexity level that may be implemented in a large-scale network.

In order to accomplish the object, in an embodiment of the present disclosure, there is provided a system for network delay guarantee based on flow aggregates and interleaved regulators.

A system for network delay guarantee based on flow aggregates and interleaved regulators comprises at least one unit network configured to guarantee first-in-first-out (FIFO) for flow aggregates; and at least one interleaved regulator per flow aggregate located at an input port or an output port of the at least one unit network, wherein among flows passing the unit network, flows that share the same network input port and the same network output port are aggregated into a single flow aggregate.

In addition, the above means for solving the problem does not list all features of the present disclosure. Various features of the present disclosure and the advantages and effects thereof may be understood in more detail with reference to specific embodiments below.

According to an embodiment of the present disclosure, by placing IRs between unit networks and performing flow aggregate-based scheduling in the unit networks, the maximum delay may be guaranteed with low complexity even when the flow aggregates traverse multiple networks.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

First, before describing a system for network delay guarantee based on flow aggregates and interleaved regulators according to the present disclosure, the ATS technique according to the prior art will be described.

Figure 1:
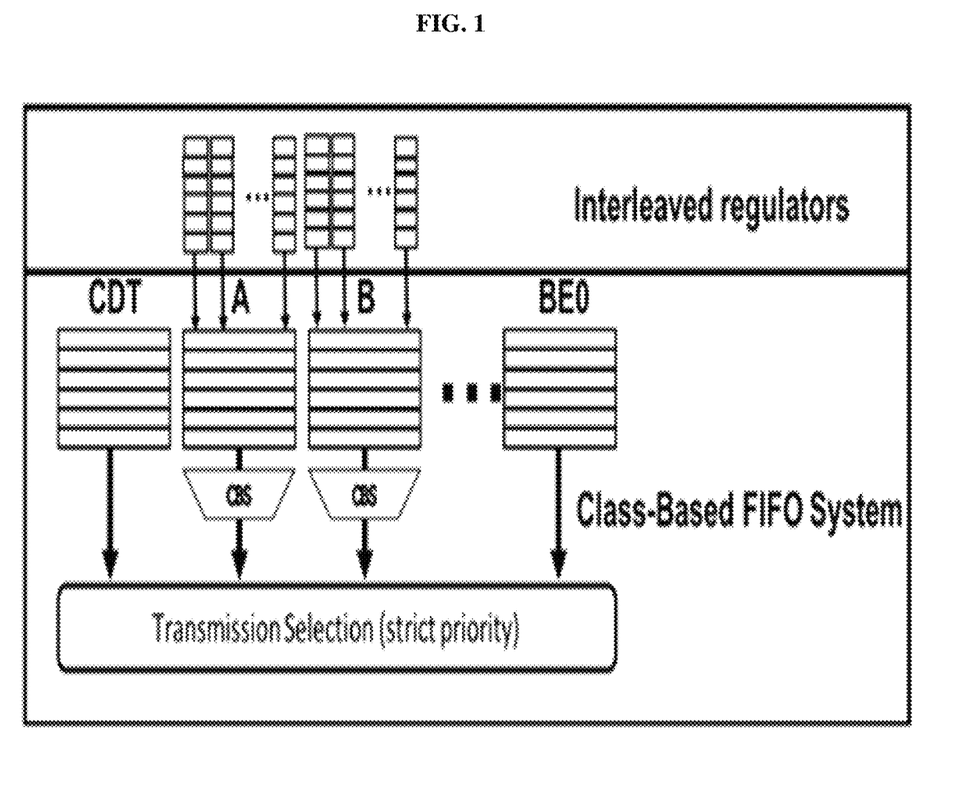
FIG. 1 is a diagram for illustrating a conventional ATS technology.

FIG. 1 is a diagram for illustrating a conventional ATS technology, and the key of the ATS technology is that in a class-based FIFO system (CBFS), an interleaved regulator (IR) is installed to an output port for each input port.

It may be proved based on Min-plus algebra that a maximum delay of the system according to the IR-attached TSN asynchronous approach as shown in FIG. 1 is identical to a maximum delay of the existing class-based FIFO system.

The mathematical symbols used therefor may be defined as follows.

(1) $N=\{0, 1, 2, \ldots\}$, $N+=\{1, 2, 3, \ldots\}$, and $R+=[0, \infty)$, which are real numbers other than a negative number.

(2) F is a set of sequences, for n of $n \in N+$, if $A_n \in [\infty, +\infty)$, $A=(A_1, A_2, \ldots)$, $A \in F$.

(3) $F_{inc}$ is a subset of F and wide-sense increasing sequences. Namely, if $A \in F_{inc}$, $A \in F$, which is equivalent to the case that for all $n \in N+$, $A_n \leq A_{n+1}$.

(4) G is a sequence composed of positive integers

A packet sequence of one flow is expressed as (A, L), where $A=(A_1, A_2, \ldots)$ is a sequence of packet observation time and $L=(L_1, L_2, \ldots)$ is a sequence of packet length. For example, an observation time of the second packet of the corresponding flow is $A_2$, and the length thereof is $L_2$. $A \in F_{inc}$, and $L \in G$. Assuming that (A, L) is an input sequence and (D, L) satisfying $D \in F_{inc}$ is an output sequence in the system S, if $A \leq D$, S is FIFO.

Here, a function (or, operator) $\Pi$ satisfying four conditions as follows may be put into consideration.

C1: $\Pi$ is a function of $F_{inc} \times G \to F$. Namely, $\Pi$ receives a packet sequence (A, L) and converts into a time sequence.

C2: $\Pi$ is causal. Namely, if $\Pi(A, L)=A'$, $A'_n$ depends on $A_1, \ldots, A_{n-1}$ and $L_1, \ldots, L_n$, but is independent from $A_m$ ($m \geq n$) or $L_m$ ($m \geq n+1$). Namely, $A'_n$ does not depend on $A_n$.

C3: $\Pi$ is homogeneous with respect to A. Namely, for a certain constant $h \in R$ and a certain sequence $A \in F_{inc}$, $L \in G$, $\Pi(A+h, L)=\Pi(A, L)+h$.

C4: $\Pi$ is isotone with respect to A. Namely, for A' of $A' \in F_{inc}$, if $A \leq A'$, for a certain sequence $L \in G$, $\Pi(A, L) \leq \Pi(A', L)$.

Now, $\Pi$-Regularity may be defined.

Definition 1 (Pi-Regularity): for a function $\Pi$ satisfying C1 to C4, if $A \geq \Pi(A, L)$, the flow packet sequence (A, L) is $\Pi$-regular.

Here, $\Pi(A, L)$ may be interpreted as an arrival curve regulated by a leaky bucket or the like. Namely, $A \geq \Pi(A, L)$ may be interpreted in the way that all packets arrive later than the arrival curve.

Further, the following may be proved.

Theorem 1 (Minimal $\Pi$-Regulator): if $\Pi$ is a function satisfying C1 to C4 (namely, corresponding to a Pi-regular operator), the "minimal $\Pi$-regulator" is a FIFO system that converts an input flow packet sequence (A, L) to an output sequence (D, L), and at this time, $D_1=A_1$ and $D_n=\max\{A_n, D_{n-1}, \Pi(D, L)_n\}$. In this case, the following is established.

(1) The system defined as above is a $\Pi$-regulator for the corresponding flow.

(2) (Minimality) For any $\Pi$-regulator that converts (A, L) into (D', L) and for all $n \in N+$, $D'_n \geq D_n$.

(3) The fact that the flow (A, L) is $\Pi$-regular is equivalent to D=A. Examples of the minimal $\Pi$-regulator include a minimal g-regulator, a packetized greedy shaper and the like, and the leaky bucket shaper corresponds to a special case of the packetized greedy shaper.

Next, a packet sequence (A, L, F) in which several flows are mixed may be considered. $L_n$ is a length of an $n^{th}$ packet. $F_n$ is a flow to which the $n^{th}$ packet belongs. If all flows are $\Pi$-Regular, IR is a FIFO system that makes the output sequences of all flows be $\Pi$-Regular. In this process, the transmission of inner packets may be delayed. Namely, all packets stored in the queue wait in the system until a packet at the first location (head) of the queue of the FIFO system satisfies the $\Pi$-Regular of the corresponding flow.

Meanwhile, the minimal IR may also be defined as follows.

Theorem 2: A packet sequence (A, L, F) may be put into consideration. If a $\Pi^f$-Regulator is defined for each flow belonging to the packet sequence, the minimal IR is a FIFO system that converts the input packet sequence (A, L, F) to an output sequence (D, L, F), and at this time, $D_1=A_1$ and $D_n=\max\{A_n, D_{n-1}, \Pi^{Fn}(D^{Fn}, L^{Fn})_{I(n)}\}$. Here I(n) is an order to an $n^{th}$ packet in the flow to which the $n^{th}$ packet belongs. In this case, the following is established.

(1) The system defined as above is an IR for the packet sequence.

(2) (Minimality) For any IR that converts (A, L, F) into (D', L, F) and all $n \in N+$, $D'_n \geq D_n$.

(3) The fact that all flows belonging to (A, L, F) are $\Pi$-regular is equivalent to D=A. Examples of the minimal IR include an urgency-based scheduler and the like.

Theorem 3: A packet sequence (A, L, F) is input to the FIFO system S. A flow f belonging to the corresponding sequence is $\Pi^f$-Regular. An output sequence (D, L, F) is input to the minimal IR. In the corresponding minimal IR, a $\Pi^f$ function is applied to the flow f. If the output sequence of the minimal IR is (E, L, F), a maximum delay of the entire system where the minimal IR is attached to S is identical to a maximum delay of only the system S. Namely, $\sup_{n \in N+}(D^n-A_n)=\sup_{n \in N+}(E_n-A_n)$. This may be explained as illustrated in FIG. 2.

Figure 2:
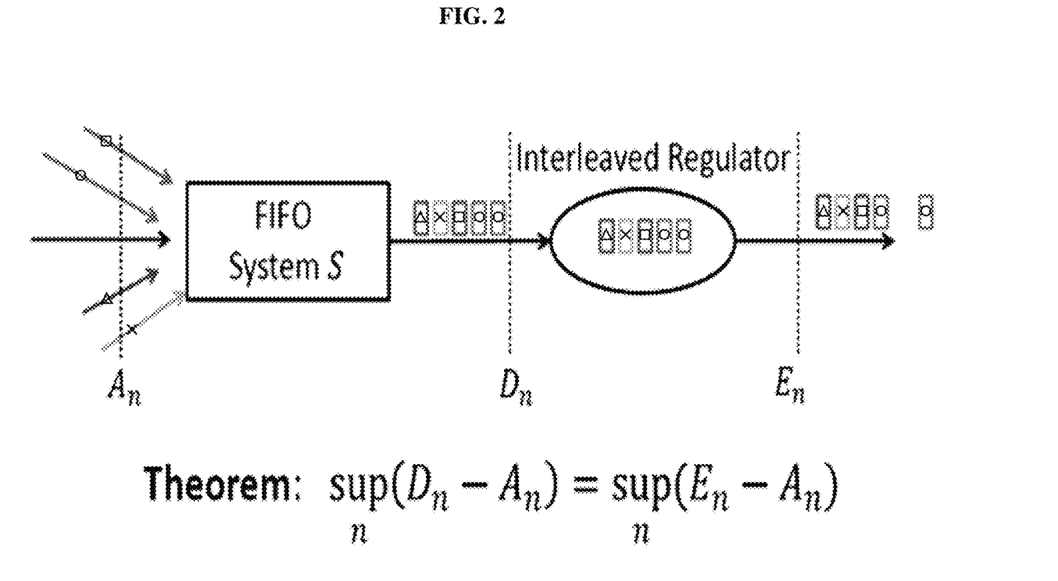
FIG. 2 is a diagram for illustrating a maximum delay of the system depicted in FIG. 1.

In order to establish the theorem of FIG. 2, the following conditions must be satisfied.

(1) Every flow input to the FIFO system S must be $\Pi$-regular. In other words, there must be a limit in the average input speed and the maximum burst size. For example, an ingress characteristic, like passing a regulator such as a leaky bucket, must be provided.

(2) The FIFO system S outputs all input packets FIFO.

(3) The IR regulates every flow to reproduce the existing ingress characteristics. Namely, the $\Pi$-regular characteristic parameters (for example, the average input speed and the maximum burst size) are made identical to the case of inputting.

(4) (Minimal IR) The IR transmits immediately when the packet at the head of the queue meets the output condition. Such IR is called a minimal regulator.

(5) The IR may provide zero delay for packets satisfying the output condition. For example, if a packet comes in when the queue is empty, the packet may be cut-through.

Here, even though all of the above conditions are satisfied and the maximum delay is not increased, this is a property that holds only for the maximum delay of the entire system. That is, the maximum delay of a specific flow may increase. If the maximum delay of the entire FIFO system is D and the maximum delay of a specific flow f is $D^f$ ($D>D^f$), the maximum delay of the corresponding flow is increased to D after the IR is applied.

In the embodiment of the present disclosure, the theorem that the maximum delay does not increase even in a more general situation may be satisfied by relaxing the condition (2) among the above conditions. The minimal IR defined in Theorem 2 is minimal with no special conditions for the packet sequence (A, L, F). It is sufficient if the Er-Regulator is defined for every individual flow of (A, L, F). Therefore, Theorem 4 below holds even if the condition (2) among the above conditions is changed as follows.

Restated condition (2): The system guarantees FIFO only for packets of an individual flow. Hereinafter, this will be called a "flow FIFO system".

Theorem 4: At least one flow packet sequence ($A^f$, $L^f$) is input to the flow FIFO system S. The flow packet sequence f is $\Pi^f$-Regular. An output sequence (D, L, F) of the flows is input to the minimal IR. The corresponding minimal IR regulates by applying a $\Pi^f$ function to the flow f. The output sequence of the minimal IR is called (E, L, F). The maximum delay of the entire system where the minimal IR is attached to the system S is identical to the maximum delay of only the system S. Namely for all flows f and n (n>0), $\sup_{f,n}(D^f_n - A^f_n) = \sup_{f,n}(E^f_n - A^f_n)$.

The minimal IR does not increase the maximum delay of the flow FIFO system S. Here, $A^f_n$ is an ingress time of the $n^{th}$ packet of the flow f, $D^f_n$ is a departure time at the system S, and $E^f_n$ is a departure time at the IR.

Proof: The maximum delay of the system S is assumed as d. Also, it is assumed that a virtual device for sending out packets of all flows f from the system S exactly at the time ($A^f$+d) is provided. If the specific flow f is H-regular, it means that $A^f$ already satisfies the arrival curve, and thus, the output of the virtual device having the departure time ($A^f$+d) also satisfies the same arrival curve. Namely, the virtual device is also a $\Pi$-regulator. Since the input of the virtual device is a packet sequence (D, L, F) of the mixed flows and d is the maximum delay of the system S, $D''_n \leq (A_n+d)$ for all n. Since the departure time of the virtual device is ($A_n$+d), the virtual device is FIFO for the corresponding sequence.

Meanwhile, the minimal IR, as in Theorem 2 described above, has a delay less than or equal to any other H-regulator. Thus, $E^f \leq A^f + d$. Namely, the departure time of the minimal IR is always less than or equal to $A^f$+d. This holds for all flows f, so Theorem 4 is proven.

Namely, according to Theorem 4, if the FIFO system is FIFO only for each flow, the existing theorem is established. According to an embodiment of the present disclosure, as the theorem is expanded as above, it is possible to use the IR and apply the theorem even in the following cases.

when output orders of flows are changed due to the difference in priority of the flows when output orders of flows are changed due to the difference in routes of the flows Therefore, the IR may be applied to a single network having various routes to which flows having various priorities are input.

Figure 3:
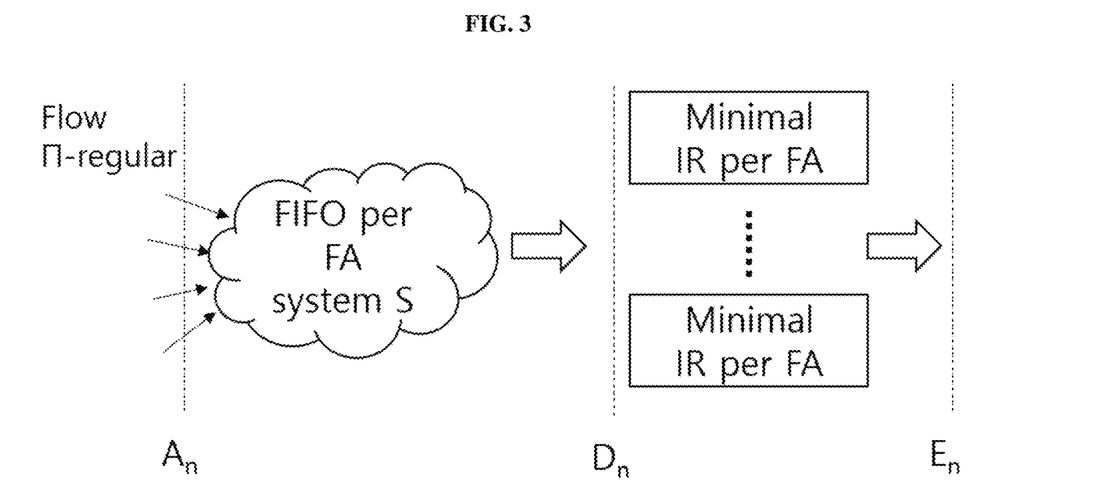
FIG. 3 is a diagram showing a system in which a FIFO system attached with minimal IRs according to an embodiment of the present disclosure.

FIG. 3 is a diagram showing a system in which a FIFO system attached with minimal IRs according to an embodiment of the present disclosure. Here, f is a flow under observation, and the system S is a network for guarantee FIFO for every flow. In the system S, the maximum delay of the flow f is assumed as $D^f$. If the system S guarantees the maximum delay D for every flow, the maximum delay including the time where the flow f passes the IR becomes D, which is greater than $D^f$. Instead, the burst size increased at the system S is relieved while passing the increased IR, thereby returning to the original burst size.

By using the above characteristics, it is possible to design an end-to-end delay guarantee system as described below.

(1) Flows are divided into two kinds, namely high priority flows and low priority flows.

(2) The low priority flows are put in a single FIFO queue at the output port of all nodes and processed in a strict priority manner. If necessary, preemption may also be applied.

(3) The high priority flows may be handled as follows.

A unit network having an appropriate size is selected. Here, the size of the unit network may be set appropriately as described below.

Among the flows passing the unit network, flows with the same network input port and the same network output port are aggregated into a single flow aggregate (FA).

At each output port of the corresponding unit network, at least one IR is installed. Namely, one IR is installed at each output port, or an IR is installed at every output port for each flow aggregate. Alternatively, at an input port of the next unit network, at least one IR per flow aggregate is installed. The unit networks with IRs are interconnected to form an entire network as shown in FIG. 4.

Only an initial input flow conforming to the arrival curve and a flow output from the IR are allowed as an input to the unit network.

In the relay node of the network, a fair queuing-based scheduling is performed per flow aggregate with a queue for each flow aggregate.

Figure 4:
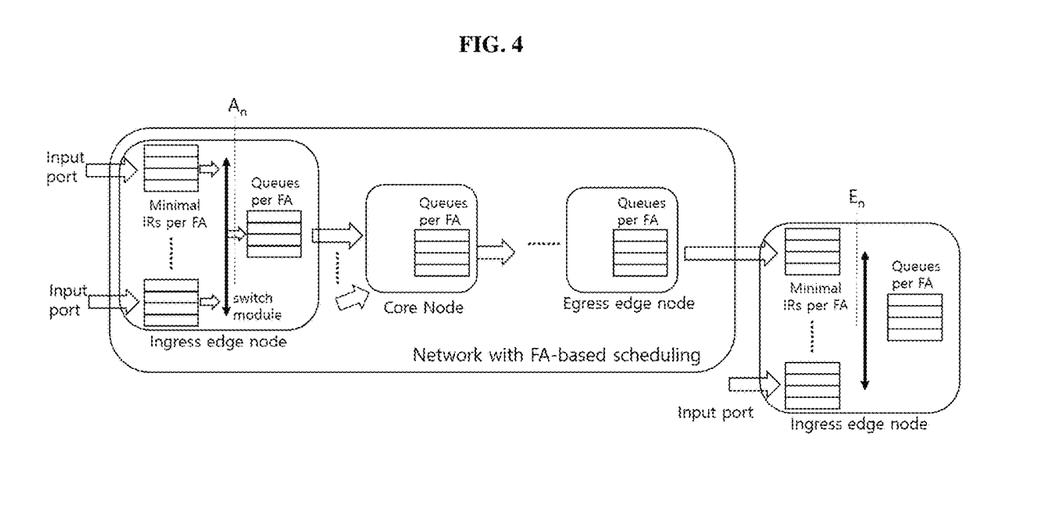
FIG. 4 is a diagram showing an overall architecture including the system for network delay guarantee according to an embodiment of the present disclosure.

FIG. 4 is a diagram showing an overall architecture including the system for network delay guarantee according to an embodiment of the present disclosure.

It contains a network and an ingress edge node of the adjacent network. Only the high priority traffic is depicted. The network in FIG. 4 schedules fairly the flow aggregates which are aggregated according to the input-output port of the network. A flow aggregate in the network is fed to the next network, at whose ingress edge node the minimal IRs are implemented and the flow aggregate is regulated. If the minimal IRs were located in the egress edge node, then the scheduled packets according to a fair scheduler should be redistributed into different IRs. The eligible times and corresponding transmission times of packets from different IRs would overlap, which causes violation of the non-zero delay condition. As exactly in the framework in ATS, we assume zero delay may be provided with a switch module in a node, for example with infinitely large bandwidth of the switch module.

Through the structure as described above, it is possible to ensure the maximum delay of all high priority flow aggregates, and also it is possible to ensure the maximum delay of flows belonging to the flow aggregate. The burst size increases due to the flow aggregation at the network input port and separation at the output port, but regains its original value while passing the IR.

In this case, the size of the unit network may be appropriately set in consideration of the demanded average delay and maximum delay. For example, as the number of relay nodes included in the unit network increases, namely as the unit network increases, the number of passes through IRs in the entire route of the flow may decrease and the average delay may decrease. However, in this case, the number of flows processed by the IR increases, and it may be a burden to process the flows at a line rate. In addition, increasing the number of flow aggregates in the unit network may also be a burden. Meanwhile, if the unit network is smaller, the number of IRs increases but the maximum delay of the flow may be reduced. However, in this case, it may be not preferable in terms of the average delay. Once the size of the unit network is set and IRs are arranged accordingly, it is required to exchange information such as flow information between the unit networks and maximum delay value required for admission control.

Hereinafter, the numerical analysis of the system designed as described above will be described.

If a flow i traverses only latency-rate (LR) servers $S_j$ while passing the network (with total k LR servers), the maximum value of the end-to-end delay experienced by packets in the flow i may be expressed as Equation 1 below.

$$D_i \leq \frac{\sigma_i - L_i}{\rho_i} + \sum_{j=1}^{k} \Theta_i^{S_j} \qquad \text{[Equation 1]}$$

In addition, mathematical symbols frequently used are shown in Table 1 below.

TABLE 1

| Symbol | Quantity |
| --- | --- |
| $L_i$ | Maximum packet length of flow i |
| $L_{max}$ | Maximum packet length of all the flows in a scheduler |
| r | Link capacity |
| $\rho_i$ | Arrival rate of flow i |
| $\sigma_i$ | Maximum burst size of flow i |
| $\varphi_i$ | Quantum value assigned for flow i |
| $\theta_i^S$ | Latency of flow i at scheduler S |
| h | Number of hops in a network |
| n | Number of flows in a flow aggregate |
| p | Number of ports in a node |
| d | Number of networks in a flow's path |

The PGPS (packetized generalized processor sharing), which may be regarded as the most ideal scheduler, and the DRR (deficit round robin) based on a simple round robin may be included in the LR server. Here, the latency of the PGPS is given as Equation 2 below.

$$\Theta_i^{PGPS} = \frac{L_i}{\rho_i} + \frac{L_{max}}{r} \qquad \text{[Equation 2]}$$

In addition, the latency of a general DRR including the case where the quantum value may be smaller than the maximum packet length is given as Equation 3 below.

$$\Theta_i^{DRR} = \frac{1}{r}\left[(F - \phi_i)\left(1 + \frac{L_i}{\phi_i}\right) + \sum_{n=1}^{N} L_n\right] \qquad \text{[Equation 3]}$$

Here, F is the sum of quantum values of active flows, N is the number of active flows, and the quantum refers to the amount of data serviced at one time, which is determined in proportion to the service rate allocated to each flow.

A FIFO scheduler is also an LR scheduler with the latency given as Equation 4 below.

$$\Theta_i^{FIFO} = \frac{1}{r}\left[\sum_{n=1}^{N} \sigma_n\right] \qquad \text{[Equation 4]}$$

where N is the number of active flows

Figure 5:
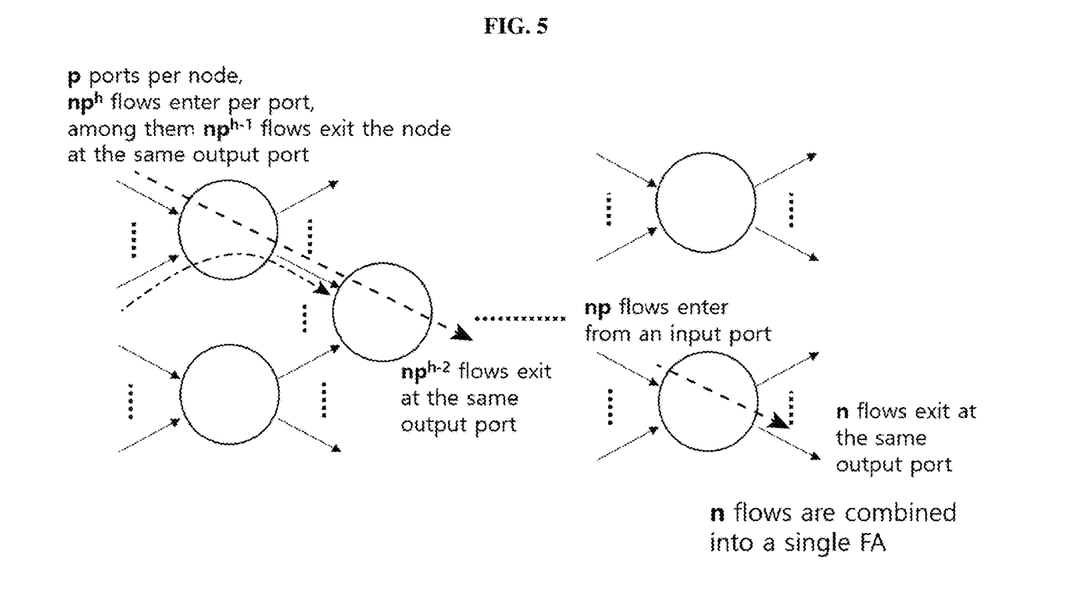
FIG. 5 is a diagram showing a structure of a unit network according to an embodiment of the present disclosure.

FIG. 5 is a diagram showing a structure of a unit network according to an embodiment of the present disclosure.

The unit network shown in FIG. 5 is a symmetric network in which all the flows may have the same characteristics and have to pass the same h hops. In addition, every node included in the unit network has two input ports and two output ports. The $np^h$ number of flows ingress to an input port, and among them, the $np^{h-1}$ number of flows egress to the same output port. On the second node, the $np^{h-2}$ number of flows among them egress to the same port, and on the last node, the $np^{h-h}=n$ number of flows among them egress to the same port. Therefore, there are the n number of flows having the same pair of {input port, output port}. It is assumed that this input/output pattern occurs on all the nodes.

First, in case of PGPS scheduler, from Equation 1 and Equation 2 the network delay of the flow-based framework is given as Equation 5 below.

$$D_i^{F\_PGPS} \leq \sum_{j=1}^{k} \Theta_j^{F\_PGPS} = \frac{h(np^h + 1)}{r/L} \qquad \text{[Equation 5]}$$

Assuming for simplicity that $\sigma_i = L_i = L_{max} = L$, and $\rho_i = r/np^h$, for all i. Similarly, for FA-based framework with the PGPS, there are $p^h$ FAs in an output port, and maximum burst of an FA is nL, therefore:

$$D_i^{FA\_PGPS} \leq \frac{nL - L}{\rho_i} + \sum_{j=1}^{k} \Theta_j^{FA\_PGPS} = \frac{(h+n-1)p^h + h}{r/L} \qquad \text{[Equation 6]}$$

The difference between the two-maximum delay, $$\max(D_i^{F\_PGPS}) - \max(D_i^{FA\_PGPS}) = \frac{(h-1)(n-1)p^h}{r/L}.$$

The difference is linearly proportional to the FA size (the number of flows in an FA) and maximum packet size, and exponentially proportional to the network size (the max number of hops in a network), and inversely proportional to the capacity of the link. The difference is zero when n=1, and positive for all n, h>1, which means the smaller bound by the FA framework Meanwhile, in case of the DRR scheduler, from Equation 1 and Equation 3 we obtain in flow-based framework $$D_i^{F\_DRR} \leq \frac{h(3np^h - 2)}{r/L}.$$

For simplicity, assuming that $\varphi_i=L_i=L_{max}=L$, since the quantum values are determined to be proportional to the flows' arrival rates which are all identical for flow-based framework. Similarly, for the FA-based framework assuming that $\varphi_i=L_i=L_{max}=L$. Every FA has the same aggregated arrival rate. Therefore, with $p^h$ FAs in an output port, and maximum burst of an FA to be nL, $$\Theta_i^{FA\_DRR} = \frac{3p^h - 2}{r/L}, \text{ and } D_i^{FA\_DRR} \leq \frac{(3h + n - 1)p^h - 2h}{r/L}.$$

The difference $$\max(D_i^{F\_DRR}) - \max(D_i^{FA\_DRR}) = \frac{(3h - 1)(n - 1)p^h}{r/L}$$

has a similar form with the one with PGPS schedulers. It is linearly proportional to the FA size and exponentially proportional to the single network size. The difference is zero when n=1.

It can be seen that the delay bound gains by applying FA framework is always positive for all n, h>1. Even if the networks are interconnected to from a bigger internetwork, in the identical flows case the gain becomes only larger, since the delay bounds of all the flows are identical.

We investigate the case where the network in FIG. 5 employs the ATS framework, that is FIFO and minimal IRs at every node. In this case Equation 1 is applied to a single node, since the minimal IR is not an LR scheduler. For simplicity, assuming that $\sigma_i=L_i=L_{max}=L$, again. There are $np^h$ flows in an output port, whose burst sizes are all L. The burst size of the aggregated flows at FIFO scheduler is therefore $np^h L$. By using Equation 1 and Equation 4, $$D_i^{FIFO} \leq \frac{2np^h - 1}{r/L},$$

since we assume $\rho_i=r$ for highest priority FIFO scheduler. There are h such nodes in a network, therefore the network delay bound is given as Equation 7 below.

$$D_i^{ATS} \leq \frac{h(2np^h - 1)}{r/L} \quad \text{[Equation 7]}$$

The difference $$\max(D_i^{ATS}) - \max(D_i^{FA\_DRR}) =$$

$$\frac{(2hn - 3h - n + 1)p^h + h}{r/L} = \frac{[(2n - 3)(h + 1/2) + 1/2]p^h + h}{r/L}$$

is larger than 0 when n≥2, which means with more than just one flows in FA, the embodiment of the present disclosure performs better than ATS.

It can be seen that the embodiment of the present disclosure with DRR schedulers performs better than both flow-based framework and ATS when the h and n are large. This is because the dominant terms in $\max(D_i^{F\_DRR})$ and max $(D_i^{ATS})$ are proportional to $hnp^h$, while the dominant term in $\max(D_i^{FA\_DRR})$ is proportional to $hp^h$ and $hp^h$.

Figure 6:
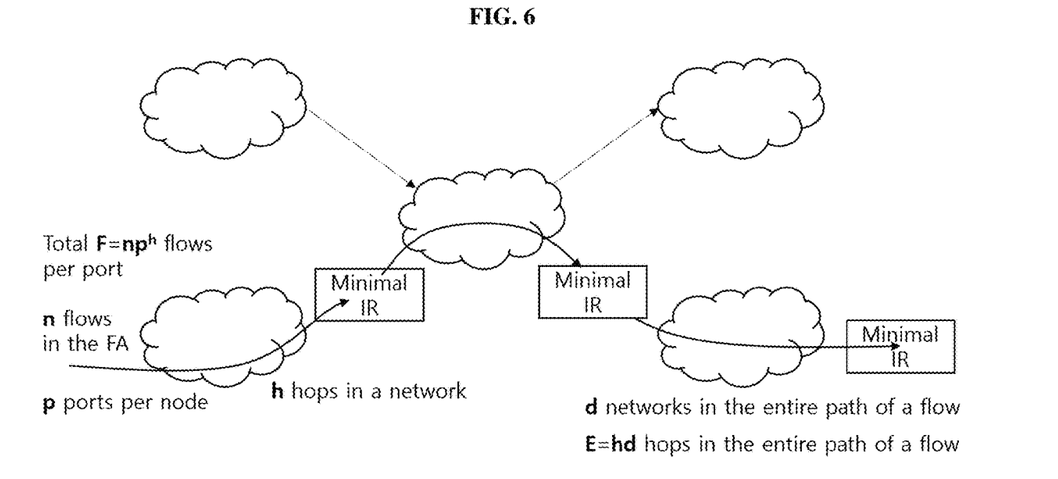
FIG. 6 is a diagram showing a structure of an entire network having a plurality of unit networks according to an embodiment of the present disclosure.

We will investigate the delay bound of the embodiment of the present disclosure with multiple networks interconnected. We will focus on how the delay bound changes with the choice of a single network size, given a fixed internetwork size. An example network for the analysis of the proposed framework is depicted in FIG. 6, in which minimal IRs are implemented between the networks. Assume the internetwork in FIG. 1 is perfectly symmetrical. A flow under observation travels d networks, with identically h hops in a network, which further makes the total number of hops the flow travels is E=hd. The critical design choice in this architecture would be the value of h (and thus d), given E. Further let us define the number of flows enter a port, F, is represented with $np^h$, as in FIG. 6. We will consider the end-to-end delay bound of the internetwork, with the fixed values of E and F.

Larger h means smaller d, n, and the number of minimal IRs. If h=E, then d=1, the networks are merged into a single network, and there is no interim IRs. If h=E and n=1, then there is no flow aggregation, which is identical to the IntServ framework. On the other hands, smaller h means smaller network size and more minimal IRs. If h=1, then IR resides at every node, which is similar to the ATS framework, except that the ATS uses FIFO scheduler.

Consider the end-to-end delay bounds of the IntServ, ATS, and the proposed framework. From the constants p, F, E, $np^h$=F, hd=E, we get d=E/h, n=F/$p^h$. First, for IntServ, since it has the "pay burst only once" property, from equation 5:

$$T_i^{F\_PGPS} \leq \frac{h(np^h + 1)}{r/dL} \quad \text{[Equation 8]}$$

Second, for the embodiment of the present disclosure, from equation 6:

$$T_i^{FA\_PGPS} \leq \frac{(h + n - 1)p^h + h}{r/dL} \quad \text{[Equation 9]}$$

Similarly:

$$T_i^{ATS} \leq \frac{h(2np^h - 1)}{r/dL} \quad \text{[Equation 10]}$$

Figure 7:
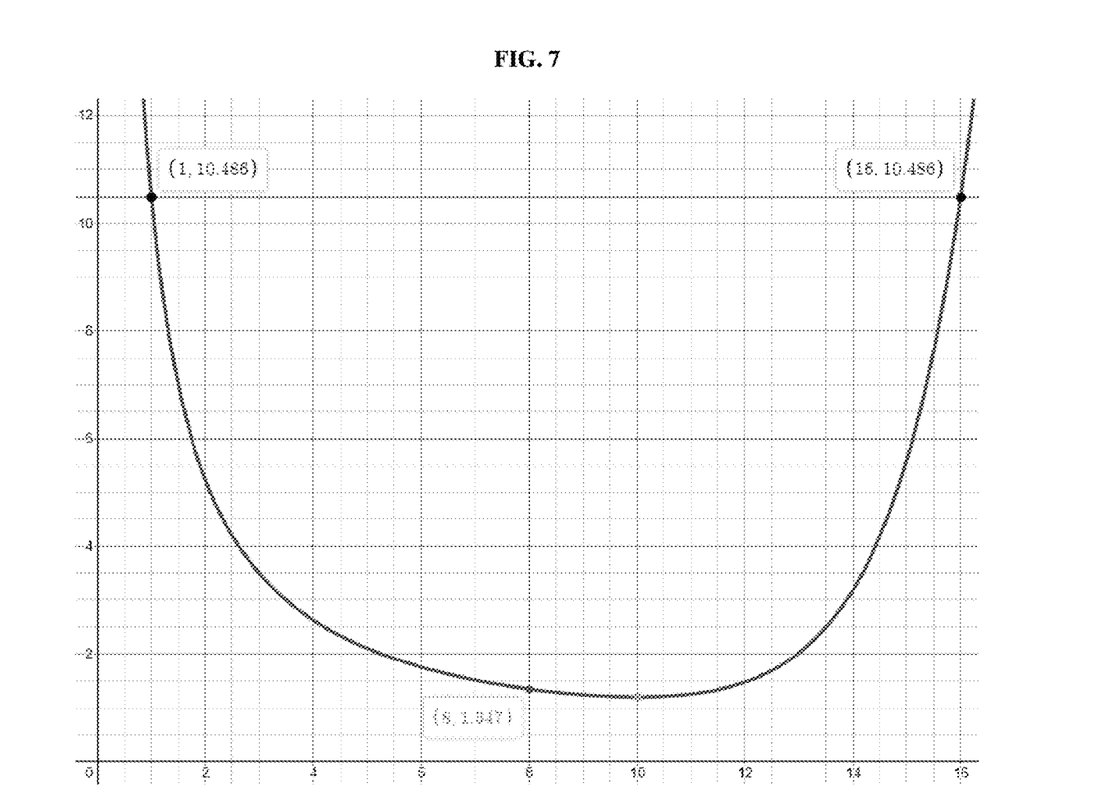
FIG. 7 is a diagram showing a delay bound according to an embodiment of the present disclosure with p=2, E=16, F=65536, r=10 Gbps, L=10 Kbit, with varying h.

Now consider a case where p=2, E=16, F=65536=216, r=1Gbps, L=10 Kbit. The RHS (Right hand side) of equation 9 give the following red curve in FIG. 7. The blue line represents the value of the RHS of (8), IntServ, which is 10.486. The value of the RHS of (10), ATS, is not shown which is 20.97.

The possible sets of parameters are {h=1, d=16, n=32768=$2^8$}, {h=2, d=8, n=$2^{14}$}, {h=4, d=4, n=$2^{12}$}, ..., {h=8, d=2, n=$2^8$}, {h=16, d=1, n=1}. If h=16, then n=1, and the case becomes identical to an IntServ framework. With h=16, the total delay of IntServ is identical to that of the proposed framework, indeed. Also note that h=1 gives the same bound. Note that all the possible choices of h and d give smaller than or equal delay bounds than that of IntServ. They are always smaller than that of ATS. The optimal choice in this case is {h=8, d=2}, which gives 1.347 sec of delay bound, which is almost 8 times better than IntServ, and 16 times better than ATS.

This result is remarkable. By only diving a path into two parts, put a single IR in the path, and aggregating flows accordingly, we can reduce the delay bound as much as to ⅛.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A system for network delay guarantee based on flow aggregates and interleaved regulators, comprising:
    at least one variable-sized unit network configured to guarantee first-in-first-out (FIFO) characteristic for flow aggregates based on an input port and an output port of the unit network,
    wherein the unit network includes a plurality of nodes,
    wherein the size of the unit network is determined in consideration of a demand average delay and a maximum delay, and
    wherein the unit network is constructed based on the determined size; and
    at least one interleaved regulator per flow aggregate located at an ingress point or egress point of the at least one unit network,
    wherein among flows passing through the unit network, flows having the same network input port and the same network output port are aggregated into a single flow aggregate, thereby the end-to-end delay bound is guaranteed when flows traverse a plurality of unit networks,
    wherein the at least one unit network allows only initial input flows conforming to their arrival curves and flows output from the interleaved regulators as inputs.

2. The system for network delay guarantee based on flow aggregates and interleaved regulators of claim 1,
    wherein the flows are divided into a plurality of first flows having a high priority compared to a set reference and a plurality of second flows having a low priority compared to the reference,
    wherein the plurality of second flows are stored in a single queue at the output ports of all nodes included in the unit network and treated with a strict priority scheme.

3. The system for network delay guarantee based on flow aggregates and interleaved regulators of claim 1, wherein a relay node included in the at least one unit network allocates a queue to each flow aggregate and performs scheduling with a fair queuing scheme.

* * * * *